Feb. 21, 1967 H. C. GOODMAN ETAL 3,305,726

MAGNETIC CORE DRIVING CIRCUIT

Filed Nov. 1, 1962

HAROLD C. GOODMAN
WILLARD J. STRONG
INVENTORS

BY John R. Faulkner
John A. Duffy
ATTORNEYS

United States Patent Office 3,305,726

Patented Feb. 21, 1967

3,305,726

MAGNETIC CORE DRIVING CIRCUIT

Harold C. Goodman, Newport Beach, and Willard J. Strong, Costa Mesa, Calif., assignors, by mesne assignments, to Raytheon Company, a corporation of Delaware Filed Nov. 1, 1962, Ser. No. 234,691
3 Claims. (Cl. 307—88)

Figures 1, 2:
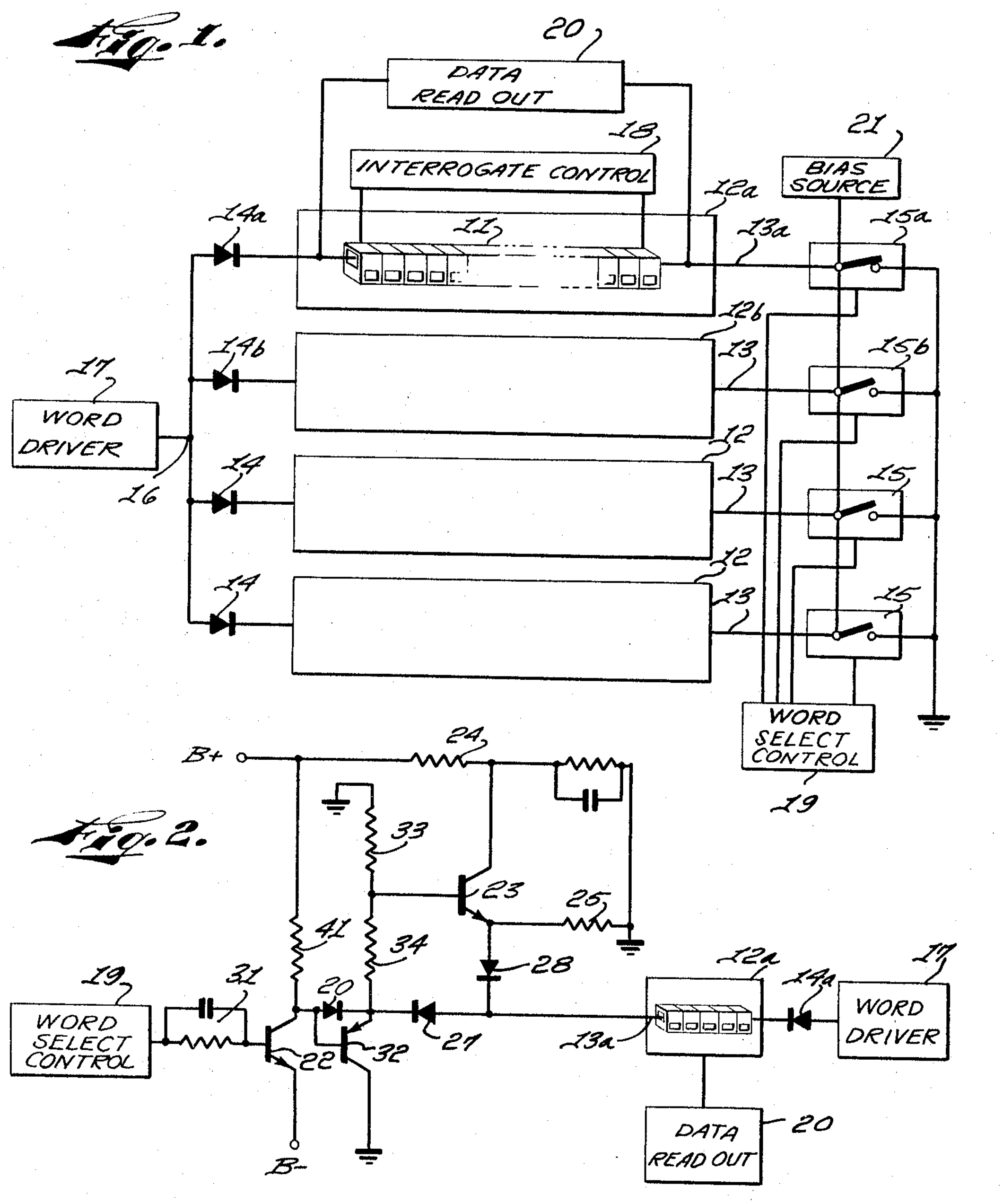

This invention relates to switching circuits and more particularly to a switching circuit for reducing noise in memory array circuitry.

In magnetic circuits such as memory arrays utilizing magnetic core elements, data is stored and processed by means of the interaction between electronic circuitry and magnetic core elements. In a typical memory array, a large number of core elements are arranged in columns and rows. Information is processed to the array by electronic switching circuitry for selectively choosing core elements. In any given read or write operation, a selected number of core elements receive electrical signals passing therethrough by conductors associated with the elements and the remainder of the core elements in the memory array are inactive with no current passing through the conductors associated therewith. Although current is prevented from flowing through the inactive core elements, stray electrical signals develop in the electronic circuitry which cause undesirable stray currents to flow through the inactive core elements creating an undesirable noise condition.

One of the major causes of undesirable noise signals in magnetic memory arrays is the noise generated by capacitance across components. While electronic circuitry prevents the flow of current through the inactive magnetic core elements there still may be inherent capacitance developed across components such as diodes due to the presence of a potential across the diode. Such potential causes a capacitance across the diode which creates undesirable noise signals that are propagated throughout the inactive circuitry of the memory array.

Known electronic switching circuitry associated with memory arrays contain no means for reducing the capacitance across a nonconducting diode due to the potential impressed thereon, and merely prevent current from flowing through the diode by opening a switch in the circuitry. An open circuit does not reduce the capacitance across the diode because of the potential still existing across the diode. Noise signals are created from the capacitance existing across any of the diodes in the electronic circuitry. Such signals greatly impair a desirable high signal to noise ratio.

Accordingly, it is an object of this invention to provide an improved switching circuit for magnetic memory circuits.

The switching circuit of this invention contemplates as a material feature thereof a circuit for reducing the junction capacitance of a diode when the switch is in an open state. According to the invention, means are provided for placing a back potential on a diode when the switch is in the open state thereby reducing the junction capacitance across the diode. As a result, stray signals generated by the diode when the switch is in the open state are reduced to a minimum thereby greatly improving the signal to noise ratio of the entire circuitry associated with the memory array. In this manner, the signals of low amplitude may be read out of a magnetic memory circuit without the necessity of complex circuits for improving the signal to noise ratio.

It is therefore another object of this invention to provide a switching circuit for magnetic memory circuits to improve the signal to noise ratio.

It is another object of this invention to provide a switching circuit in a magnetic memory circuit for placing a back potential across the diode when the switch is open.

It is a further object of this invention to provide a means in a magnetic memory switching circuit for reducing the junction capacitance across the diode when the switch is in the open state and thereby reducing the stray signals generated by the diode.

Other objects will become apparent from the following description read in conjunction with the accompanying drawing, in which:

FIG. 1 is a block diagram illustrating the application of the switching circuit of the invention to a magnetic memory circuit, and FIG. 2 is a schematic diagram of a circuit embodying the features of the invention.

According to a principal aspect of the invention, a diode with capacitance across the junction thereof is in circuit with a switch having open and closed states. A magnetic core memory element has a wire threading the core having one end responsively coupled to the switch and the other end connected to the n-junction of the diode. Means including a source of potential are provided for propagating electrical signals through the forward direction of the diode and through the wire when the switch is in the closed state, and means are provided for reducing the junction capacitance of the diode when the switch is in an open states. The junction capacitance of the diode is reduced by means of a back potential applied across the diode during periods when the switch is in the open state.

Referring now to the drawing, and more particularly to FIG. 1, a magnetic memory array is illustrated in block form having a plurality of magnetic core memory elements 11 arranged in a typical column and row order with a column comprising a word of the memory. Each of the core elements 11 may comprise the core elements as utilized in a copending application, Serial No. 61,722, now Patent No. 3,126,532, Write Interrogate Memory System, which is assigned to the assignee of the present application. The pending application illustrates magnetic core elements having a pair of orthogonally disposed openings for providing nondestructive storage of digital information. The core elements 11 may be arranged in a row 12 indicative of a word each having a conductor 13 passing through the upper opening of each of the elements 11 of the row 12. One end of the conductor 13 is connected to the n junction of a diode 14 and the other end of the conductor 13 is connected to one terminal of a switch 15. Each of the diodes 14 has its p-junction connected in common to a terminal 16 which is responsive to a word driver input 17 for selectively applying control signals to the elements 11 of the row 12. Each of the rows 12 has associated therewith a corresponding switch 15 having open and closed states with one terminal of the switch connected to the conductor 13 and the other terminal conducted to ground. Each of the switches 15 is selectively controlled by the word select control 19 which selects the switch to be opened or closed in the corresponding row for reading or writing information according to associated digital computer programming. An interrogate control 18 has windings responsively connected to each of the elements 11 for interrogating the elements as described in said copending application and a data readout 20 receives the information from the elements 11 of the rows 12.

Upon activation of one of the switches **15*a* by the word select control 19 the circuit is completed between the terminal 16 and ground through the diode 14*a*, conductor 13*a* threading the elements 11, the switch 15*a*, and ground. During this time the remaining switches 15** are in an open state preventing conduction through any of the conductors of the remaining diodes 14 In this manner the selected row 12a may have information stored therein with the nonselected rows being inactive. However, due to the circuitry wherein each of the p-junctions of the diodes 14 are connected in common, there is a positive potential across the inactive diodes 14 during the time electrical signals are conducted through the conductor 13a and the closed switch 15a. Thus, for example, while the switch 15b is in an open state preventing conduction through the diode 14b, there is nevertheless a positive potential across the diode 14b. This potential generates a capacitance across the p-n junction of the diode 14b which in turn generates stray signals which are propagated through the word 12b as well as the other nonselected words. The stray signals contribute to the noise output hampering an accurate readout at the data of readout 20 reading the signal output of the selected word 12a. Therefore, the signal to noise ratio of the memory array is seriously affected by the stray signals generated in the diodes 14.

It is well known that the capacitance across the p-n junction of a diode varies inversely as the square root of the applied voltage. Thus, when a diode such as the diode 14b has a voltage across the p-n junction, capacitance generated thereby varies inversely as the square root of the applied voltage. It is also well known that a reduction in the capacitance across the p-n junction of a diode may be realized by applying a back potential across the junction. This reduces the junction capacitance and thereby the stray signals are generated. To accomplish this according to the device of this invention as illustrated in the block diagram of FIG. 1, there is provided a bias source 21 applied to the one terminal of the switch 15a and the conductor 13a. The bias source 21 is controlled to apply a back potential through the conductor 13a across the diode 14a during periods when the switch 15a is in the open state. Likewise, the bias source 21 is responsively connected to provide a back potential across the remaining diodes in the memory array during periods when the words 12, in which the diodes are associated therewith are in the non-selected state and the switches 15 are in the open states. In this manner, the junction capacitance across all of the diodes 14 in the inactive states is greatly reduced thereby improving the signal to noise ratio at the output of the data readout 20.

Referring now to FIG. 2, there is illustrated a schematic diagram of a circuit embodying the switching circuit features of the invention. In FIG. 2 an input stage transistor 22 is responsively connected to receive signals from the word select control 19 through a resistor capacitor circuit 31 at its base. A second stage transistor 32 has its base connected to the collector of the transistor 22 with the transistor 32 conducting when its base goes negative due to the fall in potential of the collector of the transistor 22 when transistor 22 is turned on by a signal from the word select control 19. Operating potentials for the input stage transistor 22 are provided by a source of B+ potential connected through a resistor 41 to the collector of the transistor 22 with the emitter of the transistor 22 connected to a B− potential. The emitter of the transistor 32 is connected through resistors 34 and 33 to a ground potential and also through a diode 27 to one end of the conductor 13. Thus, the transistor 32 may act as one of the switches 15 of the block diagram of FIG. 1 being in the closed state when conducting, and in the open state when nonconducting. When transistor 32 is turned on, positive pulses can flow through the conductor 13 and the diode 27 and through the emitter collector circuit of the transistor 32 to ground. The word driver input 17 is utilized to propagate positive pulses through the magnetic core elements in the word 12a with current passing through the diode 14a, the elements of the word 12a, the conductor 13, the diode 27, the emitter collector circuit of the transistor 32 to the ground terminal.

When the transistor 32 is controlled to be cut off with the switch being in the open state, signals are prevented from passing through the conductor 13. A back potential is generated across the diode 14a to reduce the junction capacitance across the p-n junction by a circuit including a transistor 23 having its collector connected through a resistor 24 to the B+ potential and its emitter connected through a diode 28 to the conductor 13 and also connected through a resistor 25 to the ground potential. The transistor 23 operates as an emitter follower being turned on to the conduction state when the transistor 32 is cut off. When conducting the transistor 23 applies a positive potential through the diode 28 to the n junction of the diode 14. This positive potential produces a back potential across the diode 14 greatly reducing the junction capacitance across the diode 14. In this manner, array signals are prevented from propagating down the conductor 13 during the period that the word 12a is in the inactive state. Thus, the emitter follower circuit including the transistor 23 acts as a low impedance source to provide positive potential to the n-junction of the diode 14a when the switch including the transistor 32 is cut off. Providing a back potential across the diodes in the memory array circuit of the invention greatly reduces the stray signals otherwise produced by capacitance across the diode. In this way, the signal to noise ratio in the memory array is improved so as to improve the efficiency and accuracy of the memory circuits associated with magnetic core elements. Although according to the principal aspect of the invention a magnetic core element comprising orthogonally disposed holes as described in the copending application referred to above is utilized, it is to be realized that other magnetic core elements such as toroids and transfluxors may be utilized in circuit with a diode with the back potential applied across the p-n junction of the diode in the manner as taught by this invention.

Although the invention has been described and illustrated in detail, it is to be clearly understood that the same is by way of illustration and example only and is not taken by way of limitation, the spirit and scope of this invention being limited only by the terms of the appended claims.

We claim:

1. In a switching circuit having a switch with open and closed states and having a diode with capacitance across the junction thereof, said switch comprising a first transistor having emitter, base, and collector electrodes, said base responsively connected to receive control signals for selectively switching said switch to said open and closed states, a first source of reference potential connected to said first transistor emitter, a plurality of juxtaposed magnetic core elements, a conductor threading said core elements and having one end responsively coupled to said emitter electrode and the other end connected to the n junction of said diode, means including a source of potential responsively connected to the p-junction of said diode for causing current to flow through the forward direction of said diode, in said conductor through the emitter collector circuit of said first transistor, to said first source of reference potential when said switch is in the closed state, and emitter follower means responsively coupled to the n-junction of said diode for providing a back potential across said diode during periods when said switch is in the open state, said emitter follower means including a second transistor having emitter, base, and collector electrodes, means for connecting the emitter of said first transistor to the base of said second transistor, a second source of reference potential connected to the collector of said second transistor, and means connecting the emitter of said second transistor to said conductor.

2. In a switching circuit having a switch with open and closed states and having a diode with capacitance across the junction thereof, said switch comprising a first transistor having emitter, base and collector electrodes responsively connected to a source of operating potential, means for selectively applying control signals to said base electrode for causing said transistor to cut off and conduct corresponding to said open and closed states, a first source of reference potential connected to said first transistor emitter, a plurality of magnetic core elements arranged in an array, a conductor threading said core elements and having one end responsively coupled to said emitter electrode and the other end connected to the n-junction of said diode, means including a source of potential responsively connected to the p-junction of said diode for causing current to flow through the forward direction of said diode, in said conductor, through the emitter collector circuit of said first transistor, to said first source of reference potential when said switch is in the closed state, a second transistor having emitter, base and collector electrodes responsively connected to a source of operating potential, said second transistor having its base electrode responsively coupled to the emitter electrode of said first transistor whereby said second transistor operates as an emitter follower conducting when said first transistor is cut off and cut off when said first transistor is conducting, the emitter electrode of said second transistor being responsively connected to the n-junction of said diode for providing a back potential across said diode during periods when said switch is in the open state.

3. In a switching circuit having a switch with open and closed states and having a first diode with capacitance across the junction thereof, said switch comprising a first transistor having emitter, base, and collector electrodes, a second diode connected between said base and emitter electrodes, a first source of reference potential connected to said collector electrode, resistance means connected betwen said emitter electrode and said first source of reference potential, and a third diode connected to said emitter electrode, said base responsively connected to receive control signals for selectively switching said switch to said open and closed states, a plurality of juxtaposed magnetic core elements, a conductor threading said core elements and having one end responsively coupled to said third diode and the other end connected to the n-junction of said first diode, means including a second source of potential responsively connected to the p-junction of said first diode for causing current to flow through the forward direction of said first diode, in said conductor, through said third diode, through the emitter collector circuit of said first transistor, to said first source of reference potential when said switch is in the closed state, and emitter follower means responsively coupled to the n-junction of said first diode for providing a back potential across said first diode during periods when said switch is in the open state, comprising a second transistor having emitter, base, and collector electrodes, means for connecting said resistance means to the base of said second transistor, a third source of reference potential connected to the collector of said second transistor, and fourth diode means connecting the emitter of said second transistor to said conductor.

References Cited by the Examiner

UNITED STATES PATENTS

| | | | |
|---|---|---|---|
| 3,054,905 | 9/1962 | Lee | 307—88 |
| 3,135,948 | 6/1964 | Ashley | 307—88 X |
| 3,210,741 | 10/1965 | Cohler et al. | 307—88 X |
| 3,231,753 | 1/1966 | Brown | 307—88 X |

BERNARD KONICK, *Primary Examiner.*

S. M. URYNOWICZ, *Assistant Examiner.*